(12) United States Patent
Hiernaux

(10) Patent No.: US 10,746,184 B2
(45) Date of Patent: Aug. 18, 2020

(54) TURBINE ENGINE COMPRESSOR WITH A TURBULENCE SENSOR

(71) Applicant: SAFRAN AERO BOOSTERS SA, Herstal (BE)

(72) Inventor: Stéphane Hiernaux, Oupeye (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 146 days.

(21) Appl. No.: 15/970,325

(22) Filed: May 3, 2018

(65) Prior Publication Data
US 2018/0320700 A1 Nov. 8, 2018

(30) Foreign Application Priority Data
May 5, 2017 (BE) .................... 2017/5316

(51) Int. Cl.
| | | |
|---|---|---|
| *F04D 27/00* | (2006.01) | |
| *F01D 17/02* | (2006.01) | |
| *F01D 17/08* | (2006.01) | |
| *F04D 29/54* | (2006.01) | |

(52) U.S. Cl.
CPC .......... *F04D 27/001* (2013.01); *F01D 17/02* (2013.01); *F01D 17/085* (2013.01); *F04D 29/542* (2013.01); *F05D 2220/3217* (2013.01); *F05D 2240/121* (2013.01); *F05D 2270/10* (2013.01); *F05D 2270/101* (2013.01); *F05D 2270/301* (2013.01); *F05D 2270/303* (2013.01); *F05D 2270/3011* (2013.01)

(58) Field of Classification Search
CPC ....... F04D 27/001; F01D 17/08; F01D 17/085
See application file for complete search history.

(56) References Cited

U.S. PATENT DOCUMENTS

| | | | |
|---|---|---|---|
| 4,605,315 A * | 8/1986 | Kokoszka | ............ G01K 13/02 374/138 |
| 2004/0159103 A1 | 8/2004 | Kurtz et al. | |
| 2012/0141251 A1 | 6/2012 | Moreno Benavides | |
| 2014/0182292 A1 | 7/2014 | Hudon et al. | |

OTHER PUBLICATIONS

Search Report dated Jan. 8, 2018 for BE 201705316.

* cited by examiner

*Primary Examiner* — Igor Kershteyn
*Assistant Examiner* — Brian O Peters
(74) *Attorney, Agent, or Firm* — James E. Walton

(57) ABSTRACT

A system for measuring turbulence of a flow of a turbine engine, notably of a turbine engine compressor includes a first housing with a first pressure sensor and a first inlet, a second housing with a second pressure sensor and a second inlet inclined relative to the first inlet, and a temperature sensor. The system is configured to calculate at least two orientation components of the velocity of the flow on the basis of the pressure sensors and the temperature sensor. The inlets are disposed at the vane foot, on the leading edge at the level of an internal shell.

17 Claims, 4 Drawing Sheets

TURBINE ENGINE COMPRESSOR WITH A TURBULENCE SENSOR

This application claims priority under 35 U.S.C. § 119 to Belgium Patent Application No. 2017/5316, filed 5 May 2017, titled "Turbine Engine Compressor with a Turbulence Sensor," which is incorporated herein by reference for all purposes.

BACKGROUND

1. Field of the Application

The present application relates to the field of the analysis of the operation of a turbine engine compressor. More specifically, the present application concerns a turbulence measuring sensor with a plurality of isolated orifices. The present application also relates to an axial turbine engine, in particular an aircraft turbojet or an aircraft turboprop.

2. Description of Related Art

In a turbojet, the level of turbulence at the inlet of the compressor influences the stability of the latter. Moreover, the operation of the fan creates and amplifies the turbulence entering the compressor. In particular, the passages of the fan vanes entrain in their grooves heterogeneities entering the compressor. Being able to measure this turbulence then enables estimation of the compressor operation safety margins, and therefore prediction of critical situations.

The document US 2004/159103 A1 describes a system for determining instabilities in a turbojet compressor. The system includes a pressure transducer with an upstream orifice for measuring the total pressure, and at least four static pressure measuring orifices. Moreover, these four orifices are connected to the same common line. Also, they are disposed around a hollow tubular portion, on the upstream side. However, the pertinence of the above system remains limited in the context of the compressor.

Although great strides have been made in the area of analysis of the operation of turbine engine compressors, many shortcomings remain.

DETAILED DESCRIPTION OF THE PREFERRED EMBODIMENT

Figure 1:
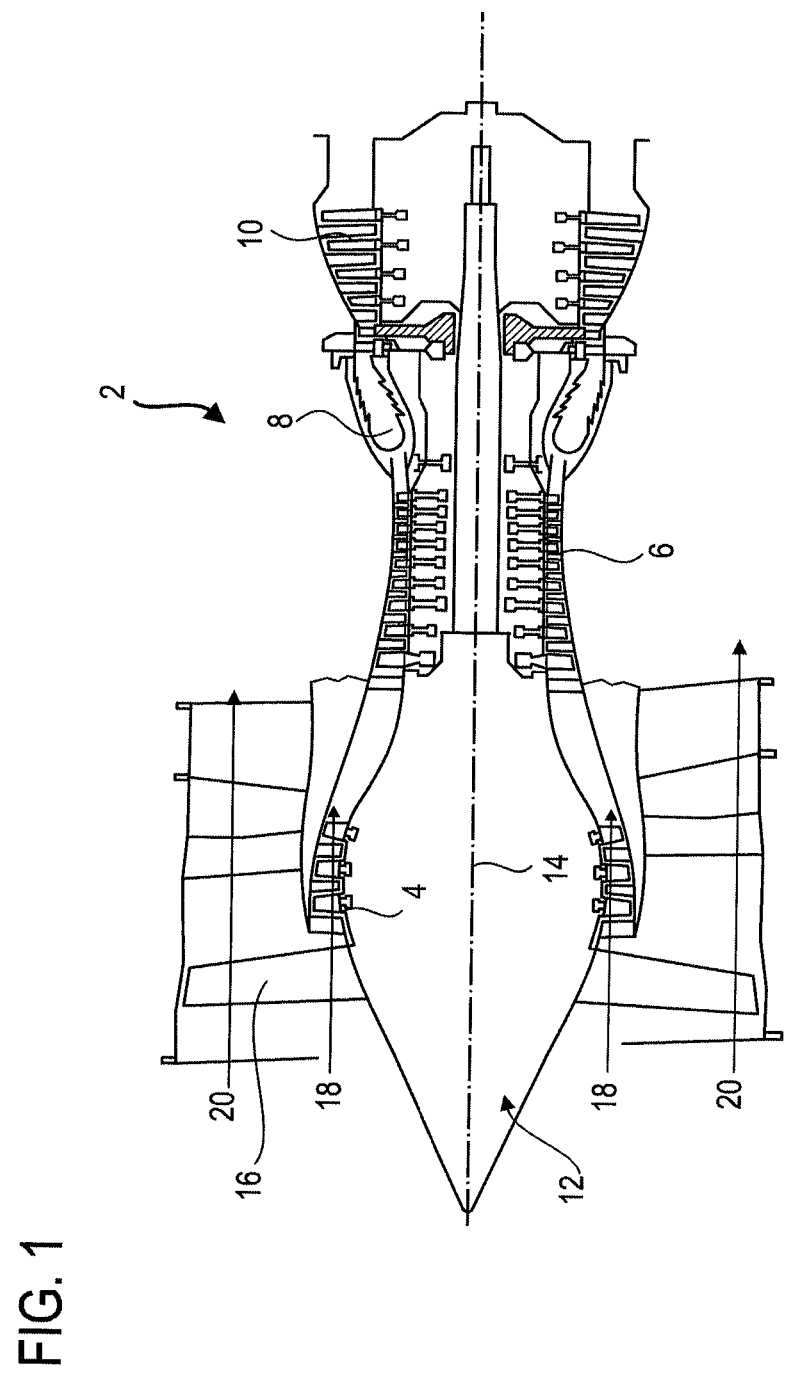
FIG. 1 shows an axial turbine engine according to the present application.

The present application aims to solve at least one of the problems raised by the prior art. To be more precise, the present application has the objective of improving compressor stability control. The present application also has the objective of proposing a solution that is simple, strong, light in weight, economical, reliable, easy to produce, convenient to service, easy to inspect and improves efficiency.

The present application relates to a compressor with a system for measuring turbulence of a flow of a turbine engine, notably of a turbine engine compressor, the system comprising: a first housing with a first pressure sensor and a first inlet, a second housing with a second pressure sensor and a second inlet inclined relative to the first inlet, noteworthy in that it further comprises a temperature sensor, the system being configured to calculate, in particular continuously, at least two orientation components of the velocity of the flow on the basis of the pressure sensors and the temperature sensor.

According to advantageous embodiments of the present application, the system can comprise one or more of the following features, separately or in all possible combinations:

The at least two orientation components of the velocity of the flow comprise an axial component, and/or a radial component, and/or a circumferential component.

The first housing, the first sensor and the first inlet are configured to be able to measure the total pressure of the flow.

The second housing, the second sensor and the second inlet are configured to be able to measure the static pressure of the gas flow.

The system further comprises a third housing with a third pressure sensor and a third inlet, the inlets all being inclined relative to one another.

The inlets comprise tubes, said tubes being inclined relative to one another.

The system further comprises a plurality of second housings, each with a second pressure sensor and a second inlet, each inlet being inclined relative to the other inlets.

The second housings are arranged around the first housing.

The system further comprises a one-piece body in which are formed the housings and the inlets, and in which the sensors are housed.

The housings are blind and/or separated from one another in a sealed manner, notably by the body.

The system is configured to measure a level of disturbance as a function of the variations of the orientation components of the velocity of the flow.

The system comprises a unit for calculating the orientation components with a calculation frequency greater than or equal to: 300 Hz, or 800 Hz, or 10 kHz for each orientation component.

The first inlet is at a distance from the or each second inlet of at most: 1 mm, or 0.5 mm, or 0.2 mm.

The system is configured to calculate at least two orientation components of the local velocity of the flow of the gas flow on the basis of the pressure sensors and the temperature sensor.

The components define the speed vector in space at a point in the flow.

The system comprises a plurality of temperature sensors each disposed in a housing, the inlets of said housings being inclined, where applicable all inclined, relative to one another; said housings each receiving a pressure sensor, the plurality where applicable comprising at least: three or four or five or seven temperature sensors.

The flow is a compressible gas flow.

The system further comprises a rotation axis of the turbine engine, the first inlet forming a general plane substantially perpendicular to the rotation axis.

The second inlet is substantially parallel to the rotation axis of the turbine engine, or inclined at an angle between: 5° and 85° inclusive, or 30° and 60° inclusive, or 40° and 50° inclusive.

The pressure sensors are electric sensors, and/or the temperature sensor is an electric sensor.

At least one or each housing inlet has a width less than or equal to: 5.00 mm, or 1.00 mm, or 0.50 mm.

The present application also relates to a system for measuring turbulence of a turbine engine flow and/or for calculating the speed of flow of a turbine engine, in particular for a compressor of a turbine engine, noteworthy in that the system comprises a temperature sensor and a vane that has: a curved leading edge, a first housing with a pressure sensor and a first opening, a second housing with another pressure sensor and a second opening, the openings being arranged along the curvature of the curved leading edge, and where applicable having different orifice orientations, the system being adapted to determine the speed of at least two components of the flow using the temperature sensor and the pressure sensors.

The present application also relates to a compressor of a turbine engine, in particular a low-pressure compressor of a turbine engine, comprising an upstream air intake with an annular row of vanes and a turbulence measuring system, noteworthy in that the system conforms to the present application, where applicable the pressure sensors are electric sensors, and/or the temperature sensor is an electric sensor.

According to advantageous embodiments of the present application, the compressor can comprise one or more of the following features, separately or in all possible combinations:

The vanes have leading edges, the inlets of the housings being disposed axially at the level of the leading edges.

The inlets of the housings are arranged radially along the same leading edge of a vane in order to measure there the at least two flow speed components.

The compressor comprises an internal shell connected to the vanes, the inlets of the housings being disposed radially at the height of the shell.

The inlets of the housings are combined in the same vane radial section representing at most: 30%, or 10%, or 5% of the radial height of the corresponding vane.

The system comprises cables extending within the thickness of a vane of the annular row of vanes.

The first inlet is intersected by the line forming the leading edge, two second inlets are disposed on the intrados face and on the extrados face, respectively, of the vane.

The system is configured to calculate the components at the vane root.

The circumferential thickness of the body is less than or equal to the maximum thickness of the vane.

The present application also consists in a turbine engine, in particular a turbojet, comprising at least one measuring system and/or one compressor, noteworthy in that the or each measuring system conforms to the present application and/or the compressor conforms to the present application.

According to one advantageous embodiment of the present application, the turbine engine, where applicable the compressor, comprises a plurality of calculation systems conforming to the present application, a temperature sensor, where applicable only one of them being common to a plurality of systems.

According to an advantageous embodiment of the present application, the turbine engine comprises an upstream fan axially facing each or a plurality of or at least one housing inlet.

As a general rule, the advantageous embodiments of each subject matter of the present application are equally applicable to the other subject matters of the present application. Each subject matter of the present application can be combined with the other subject matters, and the subject matters of the present application can equally be combined with the embodiments from the description, which additionally can be combined with one another, in accordance with all technically possible combinations.

The present application enables fine measurement of the speed of flow in two or three directions of the turbine engine. Thanks to the speed of measurement of the sensors, it becomes possible to estimate flow orientation fluctuations, whilst knowing in which directions the fluctuations evolve. The primary flow entering the compressor is therefore better known. The methods of correcting hunting and compressor stall can be executed more quickly and more accurately.

In the following description, the terms "internal" and "external" refer to a position relative to the rotation axis of an axial turbine engine. The axial direction corresponds to the direction along the rotation axis of the turbine engine. The radial direction is perpendicular to the rotation axis. Upstream and downstream refer to the principal direction of flow of the flow in the turbine engine.

FIG. 1 is a simplified representation of an axial turbine engine. In this specific instance this is a turbofan. The turbojet 2 comprises a first compression stage, termed the low-pressure compressor 4, a second compression stage, termed the high-pressure compressor 6, a combustion chamber 8 and one or more turbine stages 10. In operation, the mechanical power of the turbine 10 transmitted to the rotor 12 via the central shaft drives the movement of the two compressors 4 and 6. The latter include a plurality of rows of rotor vanes associated with rows of stator vanes. The rotation of the rotor about its rotation axis 14 therefore enables generation of a flow of air and progressive compression thereof up to the inlet of the combustion chamber 8.

An inlet fan 16 is coupled to the rotor 12 and generates a flow of air that is divided into a primary flow 18 passing through the various abovementioned stages of the turbine engine and a secondary flow 20 crossing an annular duct (partially shown) along the machine thereafter to re-join the primary flow at the turbine outlet. The fan 16 can have a diameter greater than or equal to: 2.00 m, or 2.50 m or 3.00 m. It can comprise fifteen to thirty vanes. A demultiplier can be coupled to the fan 16.

The secondary flow 20 can be accelerated so as to generate a thrust reaction, essentially useful for the flight of a jet aircraft. The primary flow 18 and the secondary flow 20 are coaxial annular flows one inside the other. They are channelled by the casing of the turbine engine and/or the shells.

Figure 2:
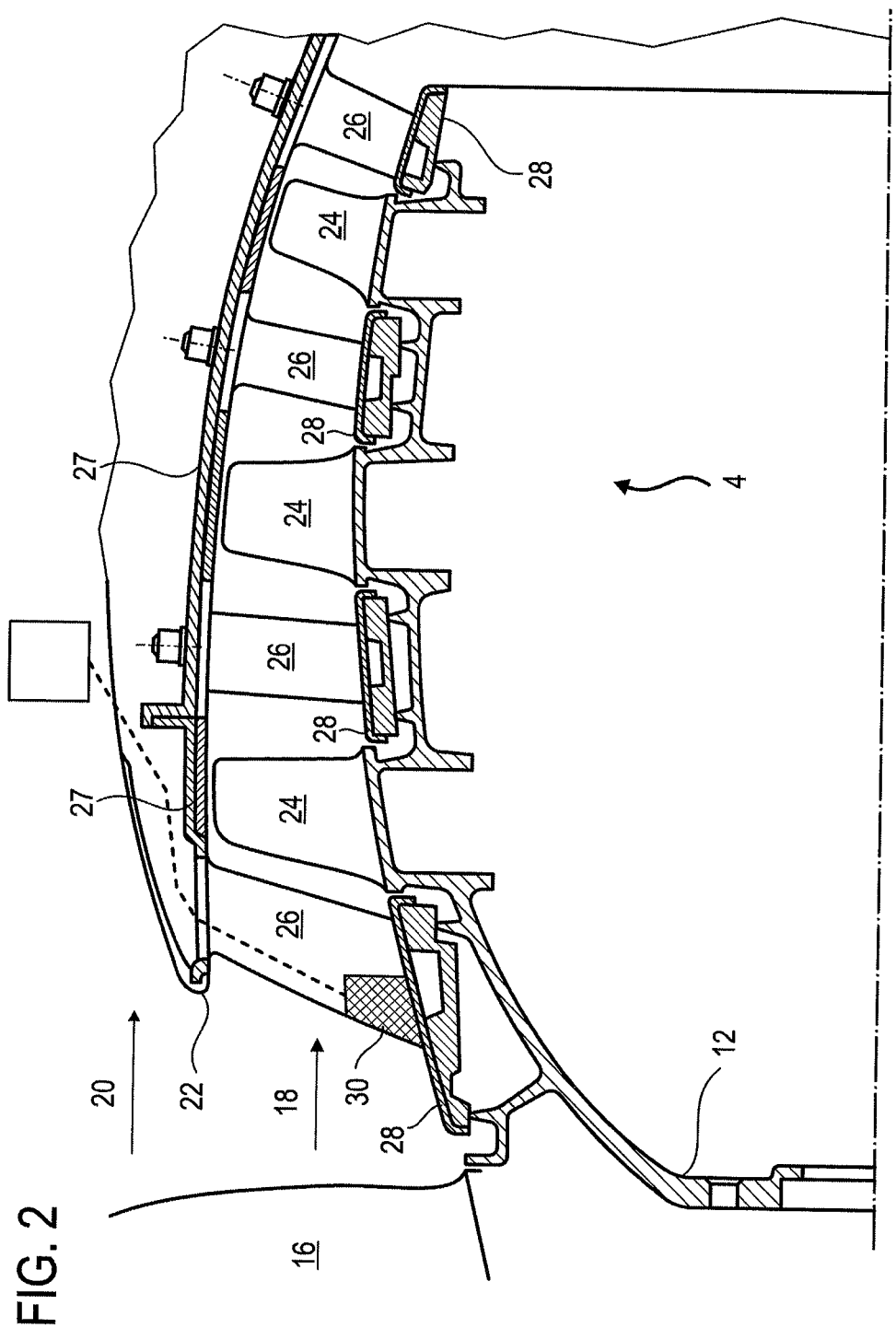
FIG. 2 is a diagram of a turbine engine compressor according to the present application.

FIG. 2 is a view in section of a compressor of an axial turbine engine such as that from FIG. 1. The compressor can be a low-pressure compressor 4. There can be seen here a part of the fan 16 and the nose 22 separating the primary flow 18 and the secondary flow 20. The rotor 12 comprises a plurality of rows of rotor vanes 24, here three rows.

The low-pressure compressor 4 comprises a plurality of, in this instance four, stators each of which contains a row of stator vanes 26. The stators are associated with the fan 16 or with a row of rotor vanes to reduce the kinetic energy of the flow of air, so as to convert the velocity of the flow into pressure, in particular into static pressure.

The stator vanes 26 extend substantially radially from an exterior casing 27 and can be fixed thereto and immobilized relative thereto using shafts. They support interior shells 28 covered with layers of material that can be abraded that provide the seal with the rotor 12. Because of the rotation of the fan 16 just upstream of the stator vanes 26 at the inlet of the compressor, i.e. at the inlet of the separator nose 22, the primary flow 18 is subject to turbulence. The primary flow 18 features pressure peaks that rotate in the wake of the fan vanes 16. In a corollary way, the turbulences feature pressure reductions, for example vortices, propagating in the wake of the fan vanes. In order to estimate the turbulence, and in particular the speeds of flow thereof in the axial direction, in the radial and circumferential directions, the compressor 4 includes at least one turbulence measuring system 30, where applicable a plurality of turbulence measuring systems 30. The circumferential width of a fan vane is greater than or equal to the distance between two upstream vanes, at the compressor inlet. This width can be greater than or equal to twice or three times said distance.

Figure 3:
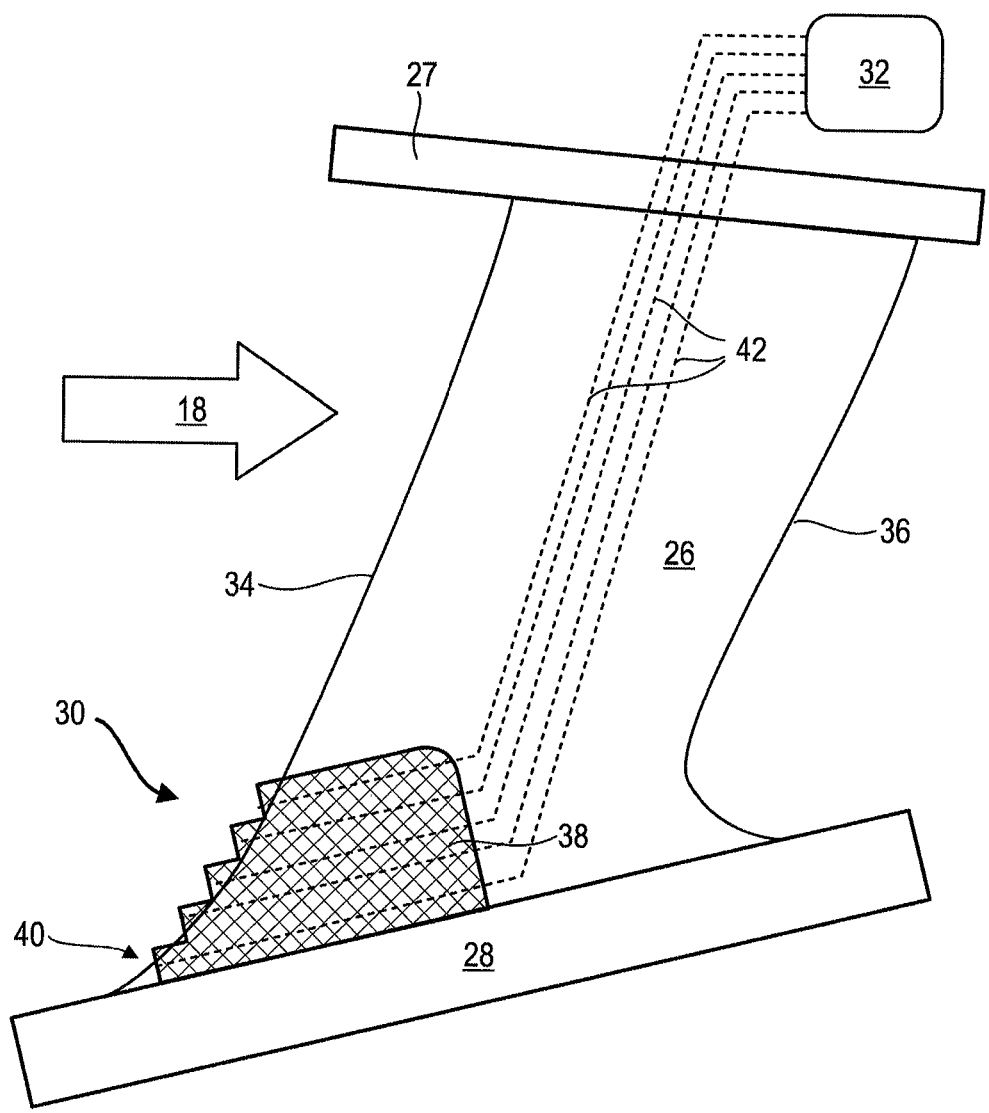
FIG. 3 shows a turbulence measuring system according to the present application.

FIG. 3 is a sketch of a portion of the turbine engine extracted from FIG. 2. The turbulence measuring system 30 includes a calculation unit 32 enabling calculation of the components of the primary flow 18. A stator vane 26 extends radially from the external casing 27 as far as the interior shell 28.

The vane 26 has a leading edge 34 and a trailing edge 36 that delimit its intrados surface and its extrados surface. The measuring system 30 can comprise a body 38. The latter can be offset from the vane 26 circumferentially and/or axially. Alternatively, the body 38 can be integrated into the vane 26, i.e. can form the intrados surface and/or the extrados surface, and/or the body is disposed between said surfaces, for example at a distance therefrom.

The body 38 can be fastened to the internal shell 28 in order to measure the turbulence and the flow fluctuations there. Moreover, the fluctuations can vary according to the passage frequency of the fan vanes. The body 38 can generally espouse the leading edge 34 of the vane 26. It can have the same curvature as and/or feature a succession of steps arranged along the leading edge 34.

The upstream face 40 of the body 38 is disposed facing into the primary flow 18. The body 38, and therefore its upstream face 40 are integrated at the radial level of the root of the vane 26, for example in the first 25% or the first 10% of the vane 26, as measured from the internal shell 28. Moreover, the body 38 can be delimited by the radial height of the internal shell 28, notably because of the inclination of its circular profile.

In order to enable measurement and calculation, the system 30 includes a plurality of sensors (not visible) connected to a calculation unit 32, which can be outside the external casing 27. To this end, the system 30 can include cables 42 passing radially through the vane 26. These cables 42 can be arranged within the thickness of the vane 26.

The calculation unit 32 includes a memory, a module for processing data coming from the sensors and a computer program. Thanks to these means, among others, the system is able to calculate each orientation component continuously. The calculation is performed several times per second, for example at a frequency greater than the passage speed of the fan vanes. The calculation frequency can be greater than or equal to 50 Hz, or 500 Hz, or 5000 Hz, in particular for each component. The calculations can be performed for different radial positions of the sensors. A characterization of the boundary layer can be obtained.

The system 30 is adapted to measure a level of disturbance as a function of the variations of the flow speed orientation components. The frequencies and the amplitudes of variation of at least one, or a plurality of, or of each orientation component are taken into account.

Figure 4:
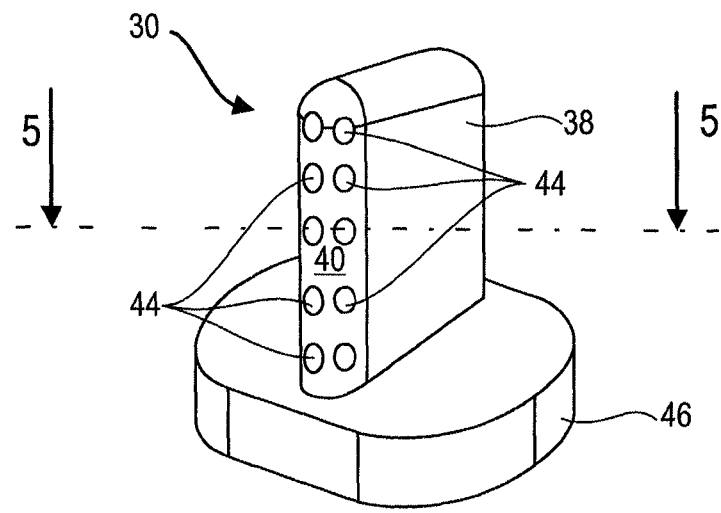
FIG. 4 shows a measuring system body according to the present application.

FIG. 4 is an isometric view of the turbine engine flow turbulence measuring system 30, the system being similar or identical to that described with reference to FIGS. 2 and/or 3.

The body 38 includes at least two housings 44 with inlets formed in the upstream face 40. The housings 44 receive electric sensors, including at least one temperature sensor and pressure sensors. The housings 44 can be arranged in at least one, for example radial, column or in a plurality of where applicable parallel radial columns. An arrangement of two or three columns is envisaged (one column being masked here). The housings 44 can also be arranged in rows, for example around the circumference. The housings 44, and thus their inlets, can form a grid on the upstream surface 40. Other arrangements can be envisaged. The grid can be heterogeneous.

A fixing plate 46 can extend the body 38. It enables it to be fixed to the shell.

Figure 5:
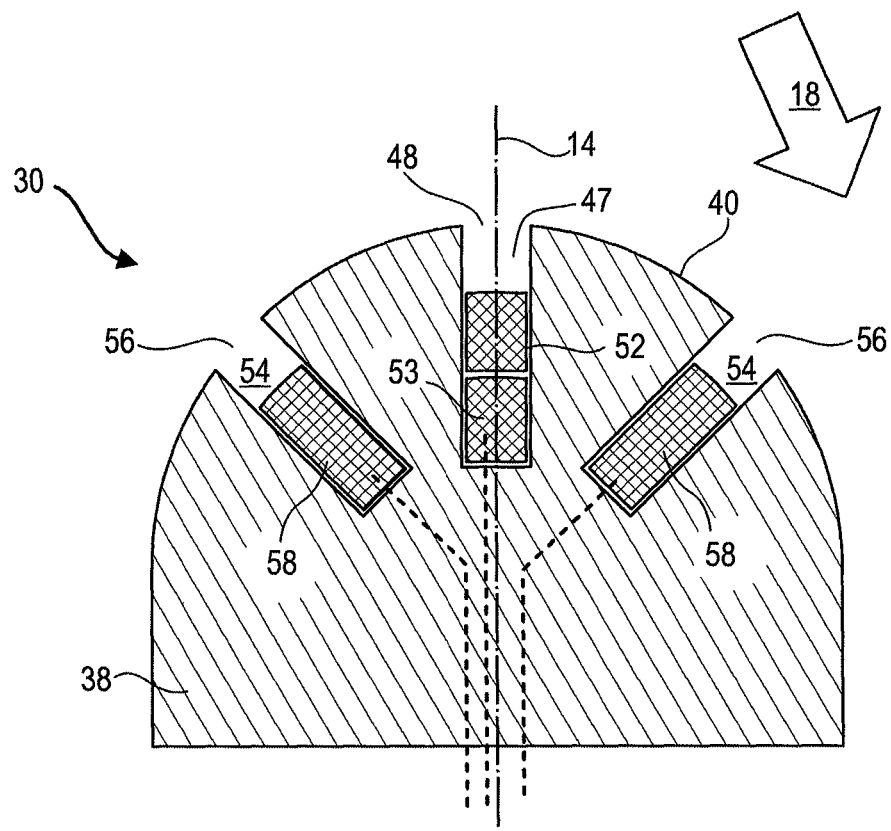
FIG. 5 is a section of the measuring system taken along the line 5-5 in FIG. 4.

FIG. 5 is a section of the measuring system taken along the line 5-5 in FIG. 4, for example along a row of housings. This row can be representative of all the housings of the system. The three housings can form a set, and the system can comprise a plurality of sets stacked radially, for example along the vane leading edge.

The body 38 receives, at this level, three housings with their inlets. The housing at the level of the rotation axis 14 can be considered a first housing 47, its inlet being a first inlet 48. The first inlet 48 can be perpendicular to the rotation axis 14, or at least comprise a straight-line segment perpendicular to said axis 14. Alternatively or additionally, the first inlet is perpendicular to the flow 18. The first housing and its first inlet can measure the total pressure, i.e. the sum of the dynamic pressure and the static pressure. The first housing 47 can receive at least one first pressure sensor 52. The first housing optionally houses a temperature sensor 53. The temperature sensor can be outside the housing.

Additionally, the body 38 can receive at least two lateral housings 54, also termed second housings 54. These second housings 54 are disposed on either side of the first housing 47. They can have second inlets 56. At least one or each of them is inclined relative to the first inlet 47. The two inlets 56 can be inclined relative to one another. Where applicable, the first inlet and two second inlets are all inclined relative to one another.

Furthermore, the system 30 includes at least three second housings the inlets of which are all inclined relative to one another as well as being inclined relative to the first inlet 48. The same feature can apply to four, five, six, or at least ten second inlets of second housings. Each inlet (48; 56) has a general plane. The respective inclinations can be measured relative to the general planes. At least one or each second housing 54 includes a second pressure sensor 58. Optionally, at least one or a plurality of or each second housing 54 receives a temperature sensor, where applicable in addition to or instead of that in the first housing 47.

Alternatively or additionally, the first housing faces into the flow 18 and/or the first housing has an inclination relative to the rotation axis 14 that is equal to the angle of attack of the fan vanes, said angle of attack being measured at the internal vane end. The angle of attack can be measured on a fan vane profile using a segment connecting the leading edge to the trailing edge of said vane. The inlet 48 is optionally perpendicular to said chord.

With the first inlet 48 oriented to face into the flow 18, the pressure sensors enable determination of the total pressure and the flow angles that are also designated "pitch" and "yaw". The Mach number can also be calculated using these pressure measurements, in particular for each inlet.

Additionally, the knowledge of the temperature, in the first housing and/or in one, or a plurality of, or each of the second housings enables the density, therefore the speed of sound and finally the velocity of the flow to be obtained, which can be broken down into its three components thanks to the knowledge of the flow angles.

The inlets (48; 56) can optionally be formed by nozzles (not shown). These nozzles extend the housings outside the body 38. They can be perpendicular to the surface of the upstream face 40. Thus, the nozzles can be inclined relative to one another.

I claim:

1. A compressor of a turbine engine, the compressor comprising:
    an upstream air intake for an air flow;
    an annular row of vanes; and
    a system for measuring turbulences in said air flow, the turbulence measuring system comprising:
        a first housing receiving a first pressure sensor and a first inlet,
        two second housings receiving a respective second pressure sensor and a respective second inlet inclined at an angle comprised between 30° and 60° relative to the first inlet; and
        a temperature sensor,
        wherein the first and second inlet are received in the same vane of the annular row of vanes, said vane having a radial height, and the first and second inlet being positioned within at most: 30%, or 10%, or 5% of the radial height of said vane;
        the system being configured to continuously calculate at least two orientation components of the velocity of the air flow on the basis of the pressure sensors and the temperature sensor.

2. The compressor according to claim 1, wherein the at least two orientation components of the velocity of the flow comprise:
    an axial component, and/or a radial component, and/or a circumferential component.

3. The compressor according to claim 1, wherein the second housings, the second sensors and the second inlets are configured to measure the static pressure of the flow.

4. The compressor according to claim 1, further comprising:
    a third housing with a third pressure sensor and a third inlet, each of the first, second, and third inlets being inclined relative to each other.

5. The compressor according to claim 1, wherein the inlets comprise:
    tubes, said tubes being inclined relative to one another.

6. The compressor according to claim 1, wherein the second housings are arranged around the first housing.

7. The compressor according to claim 1, further comprising:
    a one-piece body in which the housings and the inlets are formed, and in which the sensors are received.

8. The compressor according to claim 7, wherein the housings are blind and/or separated from one another in a sealed manner by the body.

9. The compressor according to claim 1, wherein the system is configured to measure a level of disturbance as a function of the variations of the orientation components of the velocity of the flow.

10. The compressor according to claim 1, wherein the pressure sensors and the temperature sensor are configured to perform measurements at a frequency greater than or equal to: 10 kHz.

11. The compressor according to claim 1, wherein the pressure sensors are electric sensors, and/or the temperature sensor is an electric sensor.

12. The compressor according to claim 1, wherein the vanes have leading edges, the inlets of the housings being disposed axially at the level of the leading edges.

13. The compressor according to claim 12, wherein the inlets of the housings are arranged radially along the same leading edge of a vane in order to measure there at least two flow speed components.

14. The compressor according to claim 1, further comprising:
    an internal shell connected to the vane, the inlets of the housings being disposed radially at the height of the shell.

15. A compressor of a turbine engine, the compressor comprising:
    a rotor rotating around an axis;
    an upstream air intake for an air flow;
    an annular row of vanes; and
    a system for measuring turbulences in said air flow, each vane of the annular row of vanes having a leading edge, the turbulence measuring system comprising:
        a first housing receiving a first pressure sensor and a first inlet,
        at least one second housing receiving a second pressure sensor and a second inlet inclined relative to the first inlet, wherein the first inlet and the second inlet are arranged radially along the same leading edge of a vane, wherein the first housing and the at least one second housing are equally distant from the axis, and wherein the first housing is separated from the at least one second housing in a sealed manner; and
        a temperature sensor;
        wherein the system is configured to calculate at least two orientation components of the velocity of the air flow on the basis of the pressure sensors and the temperature sensor.

16. A turbine engine, comprising:
    an upstream air intake for an air flow;
    an annular row of vanes; and
    a system for measuring turbulences in said air flow, the turbulence measuring system comprising:
        a first housing receiving a first pressure sensor, a temperature sensor and a first inlet, and
        at least one second housing receiving a second pressure sensor and a second inlet inclined relative to the first inlet;
        wherein the first and second inlet are received in the same vane of the annular row of vanes, said vane having a radial height, and the first and second inlet being positioned within at most: 30%, or 10%, or 5% of the radial height of said vane;
        the system being configured to continuously calculate at least two orientation components of the velocity of the air flow on the basis of the pressure sensors and the temperature sensor; and
    a fan axially facing at least one inlet of a housing of the turbulence measuring system, wherein the at least one second housing comprises two second housings each receiving a respective second pressure sensor and a respective second inlet inclined at an angle comprised between 30 degrees and 60 degrees relative to the first inlet.

17. The compressor according to claim 15, wherein the at least one second housing comprises two second housings each receiving a respective second pressure sensor and a respective second inlet inclined at an angle comprised between 30° and 60° relative to the first inlet.

\* \* \* \* \*